United States Patent [19]

Zguris et al.

[11] Patent Number: 5,336,275
[45] Date of Patent: Aug. 9, 1994

[54] METHOD FOR ASSEMBLING BATTERY CELLS CONTAINING PRE-COMPRESSED GLASS FIBER SEPARATORS

[75] Inventors: George C. Zguris, Canterbury, N.H.; Frank C. Harmon, Jr., Ayer, Mass.

[73] Assignee: Hollingsworth & Vose Company, East Walpole, Mass.

[21] Appl. No.: 881,160

[22] Filed: May 11, 1992

[51] Int. Cl.$^5$ ............................................. H01M 6/00
[52] U.S. Cl. .................................. 29/623.5; 29/623.1; 429/129; 429/247
[58] Field of Search ........................... 29/623.5, 623.1; 429/247, 129

[56] References Cited

U.S. PATENT DOCUMENTS

| | | | |
|---|---|---|---|
| 3,553,020 | 1/1971 | Corbin et al. | 429/88 X |
| 4,216,280 | 8/1980 | Kono et al. | 429/247 |
| 4,245,013 | 1/1981 | Clegg et al. | 429/144 |
| 4,359,511 | 11/1982 | Strzempko | 429/252 |
| 4,363,856 | 12/1982 | Waterhouse | 429/143 |
| 4,367,271 | 1/1983 | Hasegawa et al. | 429/252 |
| 4,373,015 | 2/1983 | Peters et al. | 429/57 |
| 4,391,036 | 7/1983 | Kishimoto et al. | 29/623.5 X |
| 4,465,748 | 8/1984 | Harris | 429/247 |
| 4,529,677 | 7/1985 | Bodendorf | 429/252 |
| 4,648,177 | 3/1987 | Uba et al. | 429/247 X |
| 4,908,282 | 3/1990 | Badger | 429/59 |
| 5,091,275 | 2/1992 | Brecht et al. | 429/247 |

FOREIGN PATENT DOCUMENTS 55-146872 9/1989 European Pat. Off. .
WO81/01076 4/1981 World Int. Prop. O. .

Primary Examiner—John S. Maples
Attorney, Agent, or Firm—David C. Purdue; John C. Purdue

[57] ABSTRACT

A substantially binder-free glass fiber separator, especially for valve regulated ("sealed") lead acid batteries is disclosed. The separator has a reduced thickness and temporarily inhibited resiliency. A substantially binder-free glass fiber web having a given thickness is wetted with a controlled amount of liquid and compressed to a substantially reduced thickness and the liquid suppresses the natural resiliency of the glass fiber separator so that it will have a substantially reduced thickness when the compression is released. The amount of liquid required to suppress the resiliency of the glass fiber separator is substantially less than the minimum amount of the portion of electrolyte which would be carried in the separator in a finished cell. When sufficient electrolyte is added to the moistened, reduced thickness separator, its resiliency is substantially restored and it will expand or, if confined within a cell stack within a case, it will try to expand, thereby placing the confined cell stack components under compression. The separator can be wetted and compressed in a battery manufacturing line or a glass fiber web can be compressed, before all of the liquid is removed from the web. The reduced thickness of the separator makes it easier to insert a cell stack containing the separator into a battery case and the restoration of the resiliency when electrolyte is put into the case ensures that there will be the degree of compression needed for good performance of a VRLA battery.

15 Claims, 12 Drawing Sheets

METHOD FOR ASSEMBLING BATTERY CELLS CONTAINING PRE-COMPRESSED GLASS FIBER SEPARATORS

BACKGROUND OF THE INVENTION

1. Field of the Invention

The present invention relates generally to the field of batteries and, more specifically, to the separators which are positioned between the positive and negative plates of batteries, a method for producing such separators and a method for assembling a cell using such separators.

2. Definitions

Subsequently herein, the term "percent v/v" means percent by volume; the term "percent w/w" means percent by weight; all temperatures are in °C.; and the following abbreviations have the meanings indicated: psi means pounds per square inch, $\mu$ means micron or microns; mg=milligram or milligrams; g=gram or grams; kg=kilogram or kilograms; l=liter or liters; ml=milliliter or milliliters; m=meter or meters; and cm=centimeter or centimeters. Unless the context indicates otherwise, references in the following specification and the appended claims to comparative thicknesses of separators should be understood to mean the thickness of such separators under nominal, substantially identical, pressures because, as is known to those skilled in the art, one cannot obtain a meaningful thickness measurement of glass fiber separator materials under no pressure; only when some pressure is applied does a thickness measurement have some repeatability and reliability. As used herein and in the appended claims, the phrase "substantially binder free" is to be understood to refer to glass fiber webs or sheets in which the primary mechanism for holding the sheet or web together is the entanglement of individual glass fibers as opposed to an adhesive binder mechanism such as that obtained by the addition of methyl cellulose to glass fibers. The phrase "substantially binder free" is not meant to exclude glass fiber webs or sheets which include materials which contribute to some minor degree of ionic bonding, for example, glass fiber webs or sheets which contain sodium sulfate which suppresses dendritic growth but which also contributes to minor ionic binding of the fibers; fibers in such a sheet or web would still be bound together primarily by fiber entanglement and the web or sheet itself would be substantially binder free. Similarly, references to a resiliency suppressing liquid which is "substantially free of a binder" is meant to refer to liquids which do not contain adhesive binders or binders which, if added to a glass fiber sheet or web, would replace the entanglement of individual fibers as the primary binder mechanism in the web. That phrase is not meant to exclude liquids which contain, for example, sodium sulfate or other materials which would contribute a minor degree of ionic bonding.

3. Description of the Prior Art

Valve regulated ("sealed") lead acid (VRLA) batteries are known and they can comprise a plurality of positive and negative plates, as in a prismatic cell, or layers of separator and electrode tightly wound together, as in a "jelly roll" cell. The plates are arranged so that they alternate, negative-positive-negative, etc., with separator material separating each plate from adjacent plates. The separator, typically composed of a mat of glass fibers, serves many purposes. A primary purpose of the separator is to electrically insulate one plate from the other. In addition, in VRLA batteries, glass fiber separator material provides innumerable gas channels between the plates through which oxygen can migrate from the positive electrode when generated there to the negative electrode where it can be recombined with hydrogen, according to the oxygen cycle.

Glass fiber separator material is produced commercially on paper making equipment. In most cases, no binder is used to make separator sheets; the entanglement of individual fibers serves to maintain the sheet in a cohesive structure. A great deal of work has been directed to modifying the glass fiber furnish to improve battery performance. Some of the work has entailed the addition of synthetic fibers for various reasons. Other work has been directed to the use of binders to releasably maintain glass fiber separator in a compressed state. Recent patents are discussed below.

U.S. Pat. No. 4,465,748 (Harris) discloses glass fiber sheet material for use as a separator in an electrochemical cell, and made from 5 to 35 percent by weight of glass fibers less than $1\mu$ in diameter; the patent also discloses a glass fiber sheet for such use wherein there are fibers of a continuous range of fiber diameters and lengths, and most of the fibers are not over 5 mm in length.

U.S. Pat. No. 4,216,280, (Kono et al.), discloses glass fiber sheet material for use as a plate separator in a battery, and made from 50 to 95 percent by weight of glass fibers less than $1\mu$ in diameter and 50 to 5 percent by weight of coarser glass fibers. The coarser glass fibers, the reference says, have a fiber diameter larger than $5\mu$, preferably larger than $10\mu$, and it is advantageous for some of the coarser fibers to have diameters of $10\mu$ to $30\mu$.

U.S. Pat. No. 4,373,015, (Peters et al.), discloses sheet material for use as a separator in a battery, and "comprising organic polymeric fibers"; both of the examples of the reference describe the sheet material as "short staple fiber polyester matting about 0.3 mm thick", and indicate that the polyester fibers range from about $1\mu$ to about $6\mu$ in diameter.

Sheet separators for use in conventional (not valve regulated) batteries and comprising both glass fibers and organic fibers are disclosed in all of the following U.S. Pat. Nos. 4,529,677, Bodendorf; 4,363,856, Waterhouse; and 4,359,511, Strzempko.

U.S. Pat. No. 4,367,271, Hasegawa, discloses storage battery separators composed of acrylic fibrils in an amount of up to about 10 percent by weight, balance glass fibers.

Japanese patent document 55/146,872 discloses a separator material comprising glass fibers (50–85 percent by weight) and organic fibers (50–15 percent by weight).

U.S. Pat. No. 4,245,013, Clegg et al., discloses a separator made by overlaying a first sheet of fibrous material including polyethylene fibers with a second sheet of fibrous material including polyethylene and having a synthetic pulp content higher than the first sheet.

U.S. Pat. No. 4,908,282, Badger, discloses a separator comprising a sheet made from first fibers which impart to the sheet an absorbency greater than 90% and second fibers which impart to the sheet an absorbency less than 80% wherein the first and second fibers are present in such proportions that the sheet has an absorbency of from 75 to 95%. This patent discloses that when this separator is saturated with electrolyte, unfilled voids remain so that gas can transfer from plate to plate for recombination.

It is recognized that, in order to obtain good performance in VRLA batteries, the cell stack comprising the plates and separators must be maintained under compression so that good contact is maintained between the separators and the plates. If the cell stack components reach a condition where they are not under substantial compression, battery failure will occur. In flat plate cells, this compression is conventionally achieved by assembling the cell stack components into a cell stack having a given thickness, physically compressing the cell stack, and inserting the compressed cell stack in a battery case which is sized, relative to the size of the cell stack, to maintain the components of the cell stack under compression. The step of compressing the cell stack is a difficult one because substantial compression is needed. After a cell stack is inserted into a battery case, electrolyte is added. However, because of the compression within a cell stack in a battery case, the rate at which electrolyte is absorbed into the pores of the plates and the separator is very slow. Typically, it takes several minutes to fill a VRLA battery case with electrolyte, even when a vacuum is drawn in the case.

Recently, some effort has been directed to the production of separators which are pre-compressed. European Patent Application 89103907.5 published Sep. 27, 1989 under No. 334091, discloses a dry, glass fiber separator which is pre-compressed and is maintained in that state by means of a water or acid soluble binder, preferably methyl cellulose. According to this patent document, the binder can be mixed in with the glass fiber slurry before it reaches the drying screen of a paper making machine. After most of the liquid in the slurry has been removed from the web, it is compressed between compression rollers. The web leaves the compression rollers at a reduced thickness and the binder adheres the glass fibers together in a compressed state which is maintained by the binder throughout the final drying of the web. The patent document alternatively discloses the application of a water soluble binder to the glass fibers after they have been formed into a web, followed by the steps of compressing and drying.

U.S. Pat. No. 5,091,275 (Brecht et al.) discloses a glass fiber separator which expands when exposed to electrolyte. The separator comprises glass fibers which are impregnated with an aqueous solution of colloidal silica particles and a sulfate salt. The separator is produced by forming a paper making web of glass fibers, impregnating the web with the aqueous mixture of silica and a salt, lightly compressing the impregnated web to remove some of the aqueous solution, partially drying the web, compressing the web to a final thickness and completing the drying of the web. The web is preferably compressed to a thickness which is less than the distance between plates in a given cell, so that insertion of an assembled cell stack into a case is facilitated. When electrolyte is added to the case, the salt dissolves in the electrolyte and the separator expands to provide good contact between the plates and the separators. According to the patent, the silica contributes to the recombination performance of cells incorporating the precompressed separator. The silica also contributes a great deal of stiffness to the separator, so much so that the separator may be characterized as rigid.

International patent application PCT/GB80/00159, published Apr. 16, 1981 under No. WO 81/01076, discloses method for assembling a VRLA battery wherein dry separator and plates are assembled into a cell stack, pressure is applied to the cell stack to compress it, electrolyte is added to the compressed cell stack and the pressure is removed but, according to the application, the cell stack maintains its compressed thickness, thereby making it easier to insert the cell stack in the battery case. The amount of electrolyte added is preferably the final amount of electrolyte which will be in the battery.

It should be noted that, in a conventional process for producing glass fiber separator, a glass fiber web is typically passed between compression rollers in the vicinity of the drying screen, in order to produce glass fiber separator of a desired caliper or thickness. This results in an insubstantial thickness reduction of the web at a time when it is still contains a large amount of moisture from the glass fiber slurry from which the web is produced. It is believed that the moisture content of the web when it is compressed in accordance with this conventional technique for controlling its thickness, is such that the ratio of the combined weight of the dry separator and the weight of the moisture to the weight of the dry separator would be between 8:1 and 10:1.

SUMMARY OF THE INVENTION

The instant invention is based upon the discovery that binder-free glass fiber separator of a given thickness can be wetted with a controlled amount of liquid and compressed to a substantially reduced thickness and, further, that the moisture will suppress the natural resiliency of the glass fiber separator so that it will have a substantially reduced thickness when the compression is released, even when the glass fiber separator is unrestrained. The amount of liquid required to suppress the resiliency of the glass mat separator is substantially less than the minimum amount of the portion of electrolyte which would be carried in the separator in a finished cell. The amount of liquid required to suppress the resiliency of the glass mat separator is also substantially less than the amount of electrolyte added to the cell stack components, outside of the battery case, according to the teachings of International patent application PCT/GB80/00159, and less than the moisture content of a web when it is compressed in accordance with the convention technique for controlling its thickness. Moreover, in order to produce separator with inhibited resiliency and reduced thickness in accordance with the present invention, it must contain substantially less moisture, when it is compressed, than the wet web when it is compressed to control thickness, and less moisture than the separator in the cell stack when it is compressed in accordance with the disclosure of International patent application PCT/GB80/00159.

The invention is based upon the further discovery that when sufficient electrolyte is added to the moistened, reduced thickness separator, its resiliency is substantially restored and it will expand or, if confined within a cell stack within a case, it will try to expand, thereby placing the confined cell stack components under compression. The invention is also based upon the discovery that moistened, reduced thickness separator can be used to enormous advantage in a method for producing batteries because the reduced thickness of the separator reduces or eliminates the need to compress a cell stack in order to place it within a battery case. Moreover, when electrolyte is added to the cell, the resiliency of the glass mat separator is restored and the components of the cell stack expand against the constraints of the battery case, thereby achieving a level of compression required for good performance.

The use of moistened, reduced thickness separator in a battery according to the invention greatly facilitates the filling of the battery cell with electrolyte and promotes a good, even distribution of electrolyte, thereby reducing the incidence of dry bands of separator.

Accordingly, it is an object of the present invention to provide glass fiber separator with inhibited resiliency and reduced thickness.

It is a further object of the present invention use such separator in the production of VRLA batteries where the addition of the final electrolyte restores the resiliency of the glass mat so that there is good compression within the cell stack.

It is yet another object of the invention to provide an improved method for producing VRLA batteries using a separator according to the present invention wherein the filling of a battery case with electrolyte is greatly facilitated.

These and other objects and advantages of the present invention will no doubt become apparent to those skilled in the art after having read the following detailed description of the preferred embodiment which are contained in and illustrated by the various drawing figures.

DETAILED DESCRIPTION OF THE PREFERRED EMBODIMENT

The present invention is a binder-free glass fiber separator with temporarily inhibited resiliency and reduced thickness. Dry, binderless glass fiber separator useful in VRLA batteries is resilient under certain conditions. When compressed under relatively mild pressure applied to its major surfaces, the thickness of glass fiber separator is reduced. When the compression pressure is released, the separator rebounds and returns to its original thickness, or something very close. Of course, if too much pressure is applied to the major surfaces of dry, binderless glass fiber separator, there will be severe fiber breakage and resiliency will be lost.

Figure 1:
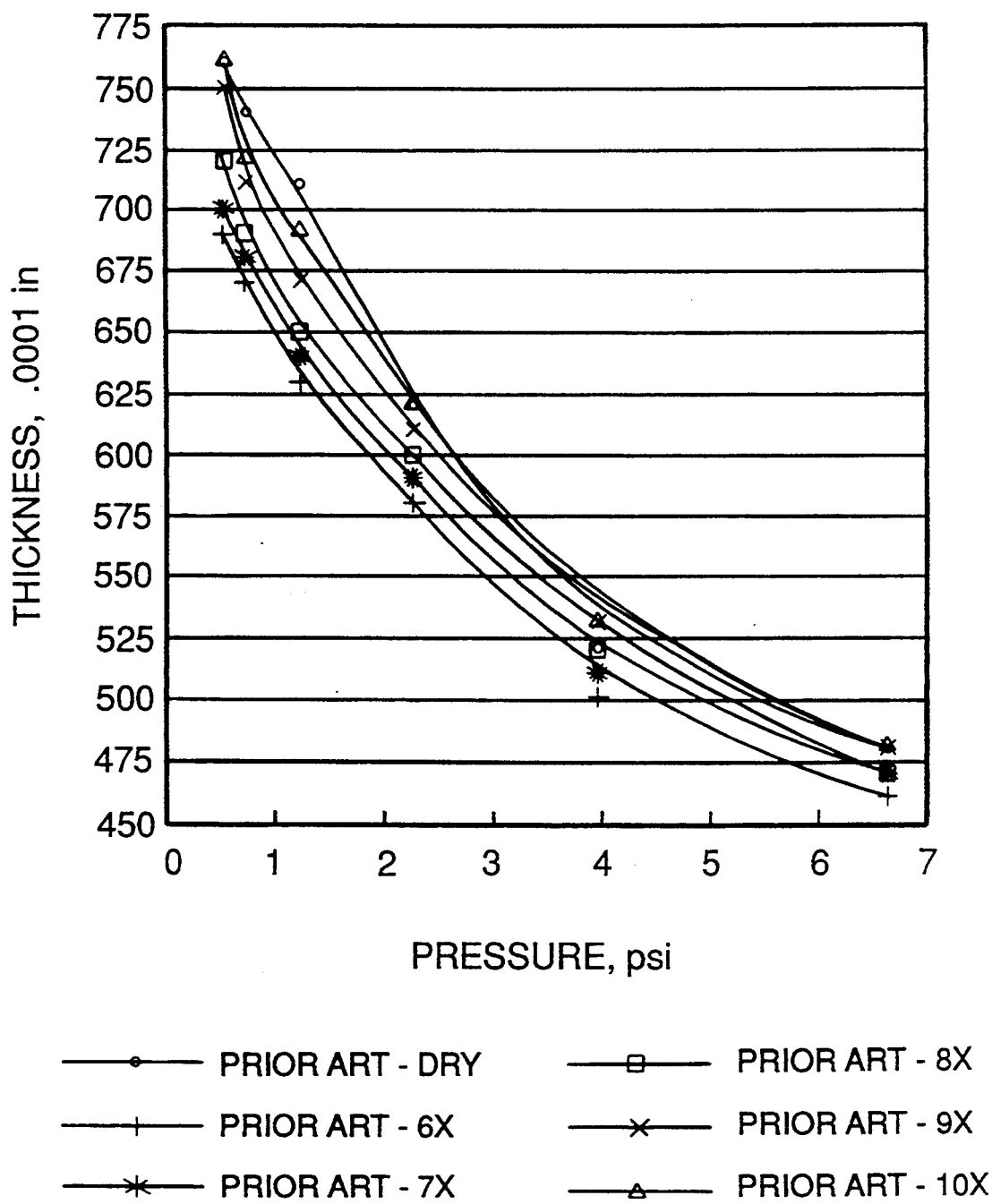
FIG. 1 is a compression curve showing the compression characteristics, i.e., thickness, at various pressures, of prior art glass fiber separator materials, one in a dry state and several wetted with various amounts of sulfuric acid having a specific gravity of 1.286.

The resiliency of prior art, binderless glass fiber separator is illustrated by compression curves presented in the FIG. 1. The compression characteristics, i.e., the thickness at various pressures, of this and other glass fiber separators were measured generally in accordance with the Battery Council International, (BCI) on apparatus including a block with an upper, hard, flat square surface approximately 6 inches by 6 inches. A small round pressure foot with a lower, flat surface was mounted on a moveable fixture over the block and, so far as possible, the lower surface of the pressure foot was maintained parallel to the hard, flat block surface. The fixture included a dial micrometer for measuring the distance between the upper block surface and the lower pressure foot surface, as well as means for measuring the pressure, if any, exerted on the lower pressure plate surface.

The apparatus and procedure described above were used to measure the thickness and resiliency of conventional, prior art glass fiber separator which was produced from a blend of glass fibers comprising 35 percent w/w Manville 206 glass fibers, average fiber diameter of $0.75\mu$ and 65 percent w/w Manville 210X glass fibers, average fiber diameter of $3.0\mu$. The separator had a grammage of 260 g/m$^2$. A piece of the dry separator material (Prior Art-Dry) was cut into a square sample, about three to four inches square. The lower major surface of the sample was placed on the block and the pressure plate was lowered until a nominal pressure of approximately 0.6 psi was observed. The thickness of the sample at that pressure was 0.076 inches, as measured by the dial micrometer. Additional measurements were made of the thickness of the sample at higher pressures and the data points are plotted in the graph which is FIG. 1. As the sample is subjected to successively higher pressures, its thickness is successively reduced. For a given sample, this test procedure can be repeated with virtually the same results. In other words, a sample that has been compressed under pressure of 6 or 7 psi and its thickness reduced by approximately 35 percent will, upon release of the pressure, expand to its original thickness or very close to it. This elasticity of glass fiber separator material will be destroyed if it is subjected to pressure which is high enough to cause substantial glass fiber breakage. The threshold amount of pressure which will destroy elasticity for a given separator is affected by the diameter of fibers in the separator, the thickness of the separator and other factors, as well. In many cases, the elasticity will be destroyed by the amount of pressure required to reduce the thickness of a separator sample by about fifty percent.

Additional measurements were taken to investigate the compression characteristics of glass fiber separator corresponding with the Prior Art-Dry except that, prior to testing, the samples were loaded with electrolyte, specifically, $H_2SO_4$ having a specific gravity of 1.286 g. Electrolyte was added to one sample, designated Prior Art-6X in FIG. 1, in a controlled amount so that the ratio of the combined weight of the dry separator and the weight of the electrolyte to the weight of the dry separator was 6:1. Additional samples were tested in which this ratio was 7:1, 8:1, 9:1 and 10:1 and they are identified in FIG. 1 by the legends Prior Art-7X, Prior Art-8X, Prior Art-9X and Prior Art-10X, respectively. The samples which were loaded with electrolyte behaved elastically and their thickness curves in FIG. 1 are extremely similar to the compression curve for Prior Art-Dry.

EXAMPLE 1

Figure 2:
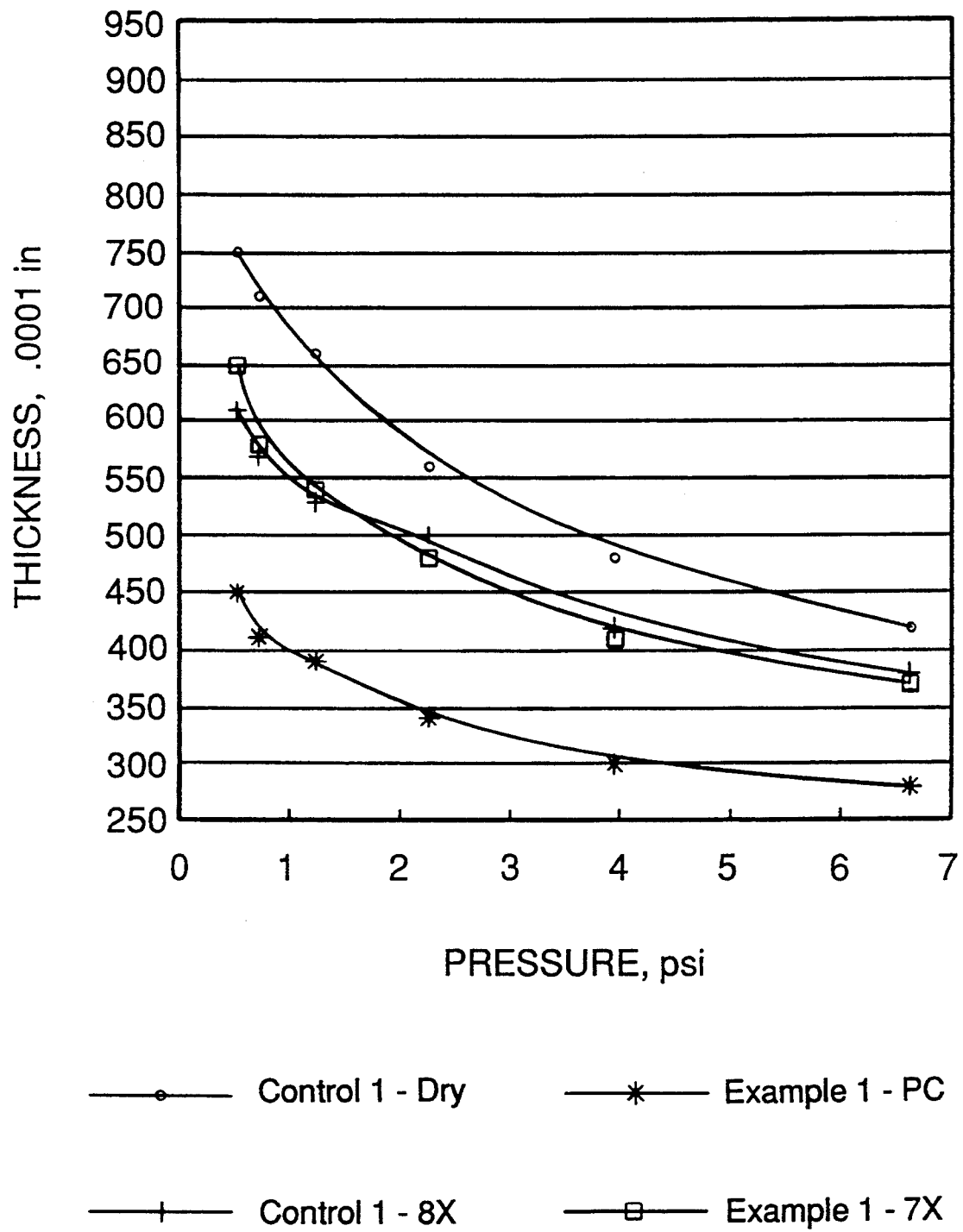
FIG. 2 is a compression curve and a rebound curve showing the compression characteristics, before and after electrolyte loading, of two glass fiber separator materials, one produced in accordance with the present invention, and one corresponding with prior art separator material.

Glass fiber separator was produced from a blend of glass fibers comprising 35 percent w/w Manville 206 glass fibers, average fiber diameter of $0.75\mu$ and 65 percent w/w Manville 210X glass fibers, average fiber diameter of $3.0\mu$. The separator had a grammage of 240 g/m². In accordance with the present invention, acidified water, specifically, deionized water to which $H_2SO_4$ was added to achieve a pH of between 2.5 and 2.7, was added to the separator in an amount such that the ratio of the combined weight of the dry separator and the weight of the acidified water to the weight of the dry separator was 2.7:1. The wetted separator, in accordance with the invention, was passed between compression rollers which were set so that, upon leaving the compression rollers, the wetted separator exhibited suppressed resiliency, as explained below. A compression curve for this glass fiber separator is presented in FIG. 2, designated Example 1-PC (the PC here means precompressed). In order to illustrate the degree of resiliency suppression exhibited by Example 1-PC, there is a compression curve, designated Control 1-Dry in FIG. 2 for a conventional, dry glass fiber separator corresponding in composition and grammage with the glass fiber separator of Example 1-PC. The Example 1-PC separator has a thickness which is between about 33% and 40% less, under various pressures, than the thickness of the Control 1-Dry separator at those pressures. Thus, it is shown that a wetted separator, in accordance with the invention, has suppressed resiliency by comparison with a dry but otherwise comparable separator. The significance of the resiliency suppression is greatly enhanced, however, by the fact that the resiliency can be restored in a controlled fashion.

After the testing described above, electrolyte, specifically, $H_2SO_4$ having a specific gravity of 1.286 g, was loaded into the Example 1-PC separator sample in an amount such that the ratio of the combined weights of the dry separator, the acidified water and the electrolyte to the weight of the dry separator was 7:1. This ratio was selected to approximate the amount of the total electrolyte in a VRLA battery that would be carried in the glass fiber separator. Thereafter, the compression characteristics of the Example 1-PC separator loaded with electrolyte, was measured and the resulting compression curve is presented in FIG. 2 in a plot labeled Example 1-7X. To a large extent, the resiliency of the Example 1-PC separator was restored by loading it with electrolyte, as shown in the Example 1-7X plot. In fact, the resiliency of the Example 1-7X separator was substantially the same as the resiliency of the Control 1-Dry separator after it was loaded with electrolyte, specifically, $H_2SO_4$ having a specific gravity of 1.286 g, in an amount such that the ratio of the combined weight of the dry separator and the weight of the electrolyte to the weight of the dry separator was 7:1. This compression curve for the Control 1-Dry separator after it was loaded with electrolyte is presented in a plot designated Control 1-7X in FIG. 2. Accordingly, it is demonstrated that wetted separator with suppressed resiliency, in accordance with the invention, when loaded with electrolyte in an amount similar to the amount it would carry in service, has restored resiliency substantially equal to that of conventional separator loaded with a like amount of electrolyte. Further tests were conducted on glass fiber separators of varying grammages.

EXAMPLE 2

Figure 3:
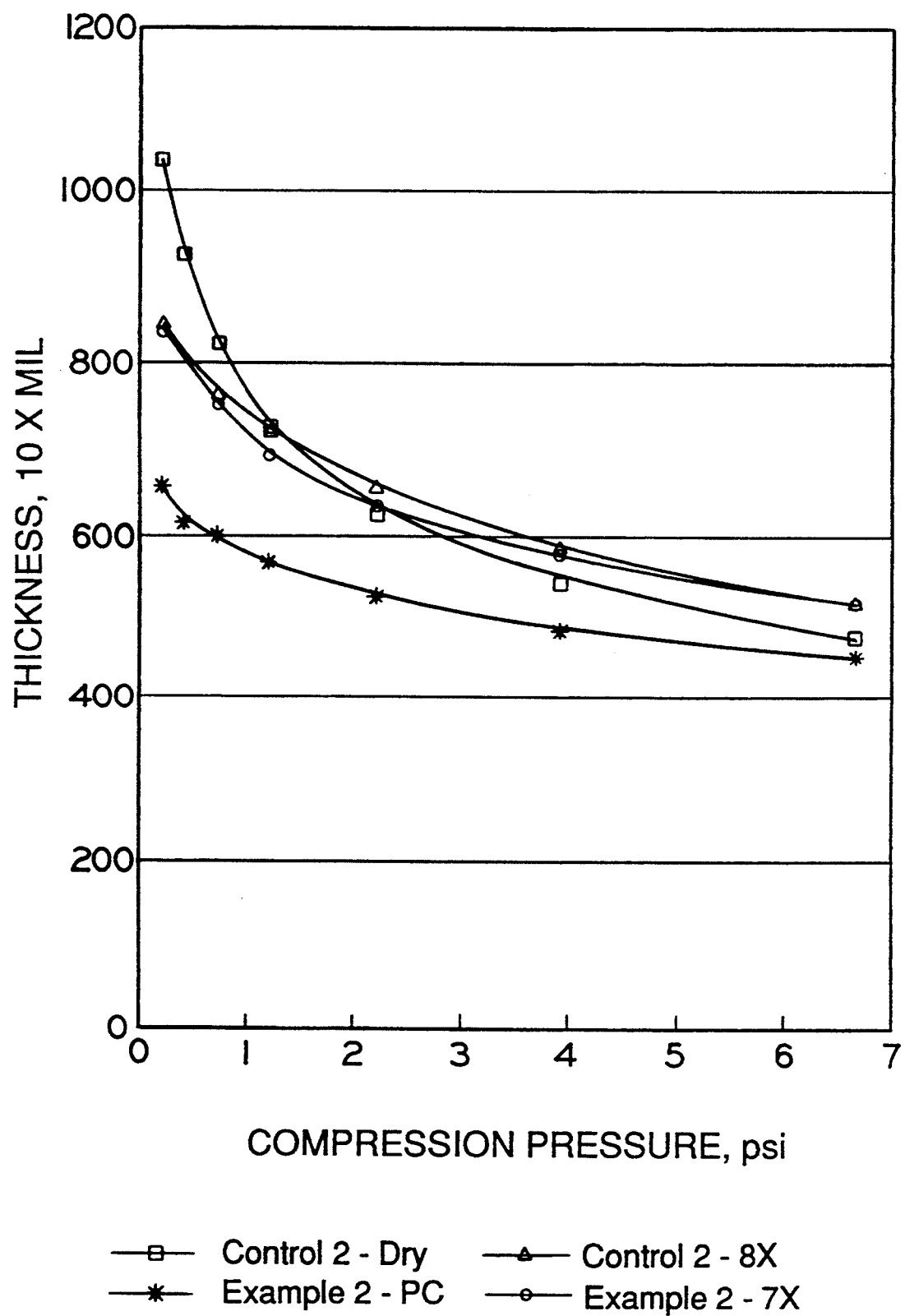
FIG. 3 is a compression curve and a rebound curve showing the compression characteristics, before and after electrolyte loading, of two glass fiber separator materials, one produced in accordance with the present invention, and one corresponding with prior art separator material.

Glass fiber separator was produced from a blend of glass fibers comprising 35 percent w/w Manville 206 glass fibers, average fiber diameter of $0.75\mu$, and 65 percent w/w Manville 210X glass fibers, average fiber diameter of $3.0\mu$. The separator had a grammage of 280 g/m². In accordance with the present invention, acidified water produced by adding $H_2SO_4$ to deionized water in an amount such that the acid had a pH between 2.5 and 2.7, was added to the separator in an amount such that the ratio of the combined weight of the dry separator and the weight of the acidified water to the weight of the dry separator was 2.7:1. The wetted separator, in accordance with the invention, was passed between compression rollers which were set so that, upon leaving the compression rollers, the wetted separator exhibited suppressed resiliency. A compression curve for this separator is presented in FIG. 3, designated Example 2-PC. In order to illustrate the degree of resiliency suppression exhibited by Example 2-PC, there is a compression curve, designated Control 2-Dry in FIG. 3, for a conventional, dry glass fiber separator corresponding in composition and grammage with the glass fiber separator of Example 2-PC. The Example 2-PC separator has a thickness which is between about 6% and 37% less, under various pressures, than the thickness of the Control 2-Dry separator at those pressures. Under nominal pressures of 2 psi and less, the Example 2-PC glass fiber has a thickness which is between about 20% and 37% less than the thickness of the Control 2-Dry separator. Like the separator of Example 1, the Example 2-PC separator has suppressed resiliency by comparison with a dry but otherwise comparable separator and its resiliency can be restored in a controlled fashion.

After the testing described above, electrolyte, specifically, $H_2SO_4$ having a specific gravity of 1.286 g, was added to the Example 2-PC separator sample in an amount such that the ratio of the combined weight of the dry separator, the acidified water and the weight of the electrolyte to the weight of the dry separator was 7:1. This ratio was selected to approximate the amount of the total electrolyte in a VRLA battery that would be carried in the glass fiber separator. Thereafter, the compression characteristics of the Example 2-PC separator loaded with electrolyte, were measured and the results are presented in FIG. 3 in a plot labeled Example 2-7X. To a large extent, the resiliency of the Example 2-PC separator was restored by the addition of electrolyte, as shown in the Example 2-7X plot. In fact, the resiliency of the Example 2-7X separator was substantially the same as the resiliency of the Control 2-Dry separator after it was loaded with electrolyte, specifically, $H_2SO_4$ having a specific gravity of 1.286 g, in an amount such that the ratio of the combined weight of the dry separator and the weight of the electrolyte to the weight of the dry separator was 7:1. The compression curve for this separator is designated Control 2-7X in FIG. 3.

EXAMPLE 3

Figure 4:
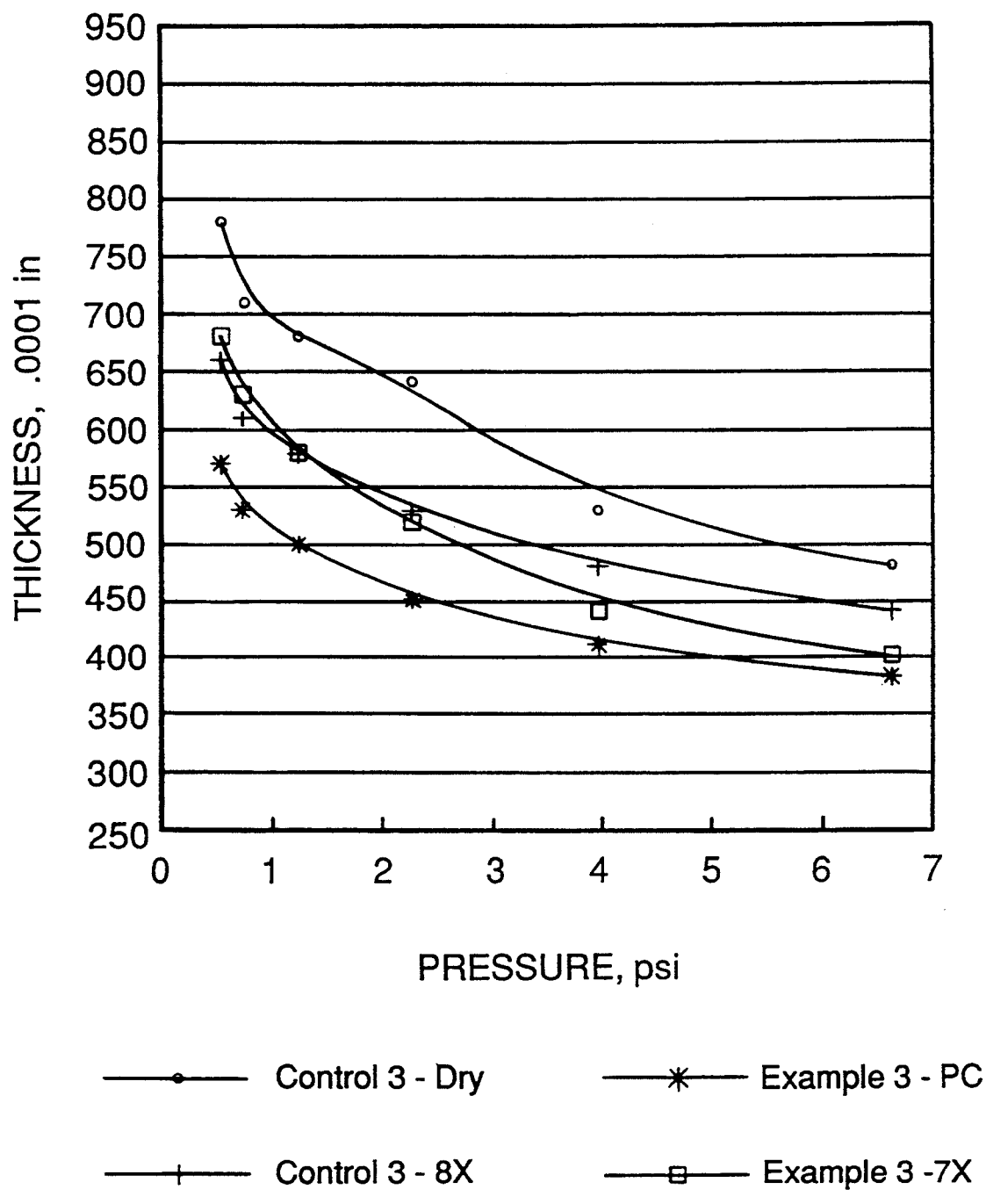
FIG. 4 is a compression curve and a rebound curve showing the compression characteristics, before and after electrolyte loading, of two glass fiber separator materials, one produced in accordance with the present invention, and one corresponding with prior art separator material.

Glass fiber separator was produced from a blend of glass fibers comprising 35 percent w/w Manville 206 glass fibers, average fiber diameter of 0.75$\mu$, and 65 percent w/w Manville 210X glass fibers, average fiber diameter of 3.0$\mu$. The separator had a grammage of 260 g/m$^2$. In accordance with the present invention, acidified water produced by adding $H_2SO_4$ to deionized water in an amount such that the acidified water had a pH between 2.5 and 2.7, was added to the separator in an amount such that the ratio of the combined weight of the dry separator and the weight of the acidified water to the weight of the dry separator was 2.7:1. The wetted separator, in accordance with the invention, was passed between compression rollers which were set so that, upon leaving the compression rollers, the wetted separator exhibited suppressed resiliency. A compression curve for this separator is presented in FIG. 4, designated Example 3-PC. In order to illustrate the degree of resiliency suppression exhibited by Example 3-PC, there is a compression curve, designated Control 3-Dry in FIG. 4, for a conventional, dry glass fiber separator corresponding in composition and grammage with the glass fiber separator of Example 3-PC. The Example 3-PC separator has a thickness which is between about 20% and 30% less, under various pressures, than the thickness of the Control 3-Dry separator at those pressures. Under nominal pressures of 4 psi and less, the Example 3-PC glass fiber has a thickness which is between about 23% and 30% less than the thickness of the Control 3-Dry separator. Like the separator of Examples 1 and 2, the Example 3-PC separator has suppressed resiliency by comparison with a dry but otherwise comparable separator and its resiliency can be restored in a controlled fashion.

After the testing described above, additional electrolyte, specifically, $H_2SO_4$ having a specific gravity of 1.286 g, was added to the Example 3-PC separator sample in an amount such that the ratio of the combined weight of the dry separator, acidified water and the weight of the electrolyte to the weight of the dry separator was 7:1. This ratio was selected to approximate the amount of the total electrolyte in a VRLA battery that would be carried in the glass fiber separator. Thereafter, the compression characteristics of the Example 3-PC separator loaded with electrolyte, were measured and the results are presented in FIG. 4 in a plot labeled Example 3-7X. To a large extent, the resiliency of the Example 3-PC separator was restored by the addition of electrolyte, as shown in the Example 3-7X plot. In fact, the resiliency of the Example 3-7X separator was substantially the same as the resiliency of the Control 3-Dry separator after it was loaded with electrolyte, specifically, $H_2SO_4$ having a specific gravity of 1.286 g, in an amount such that the ratio of the combined weight of the dry separator and the weight of the electrolyte to the weight of the dry separator was 7:1. The compression curve for this separator is designated Control 3-7X in FIG. 4.

EXAMPLE 4

Figure 5:
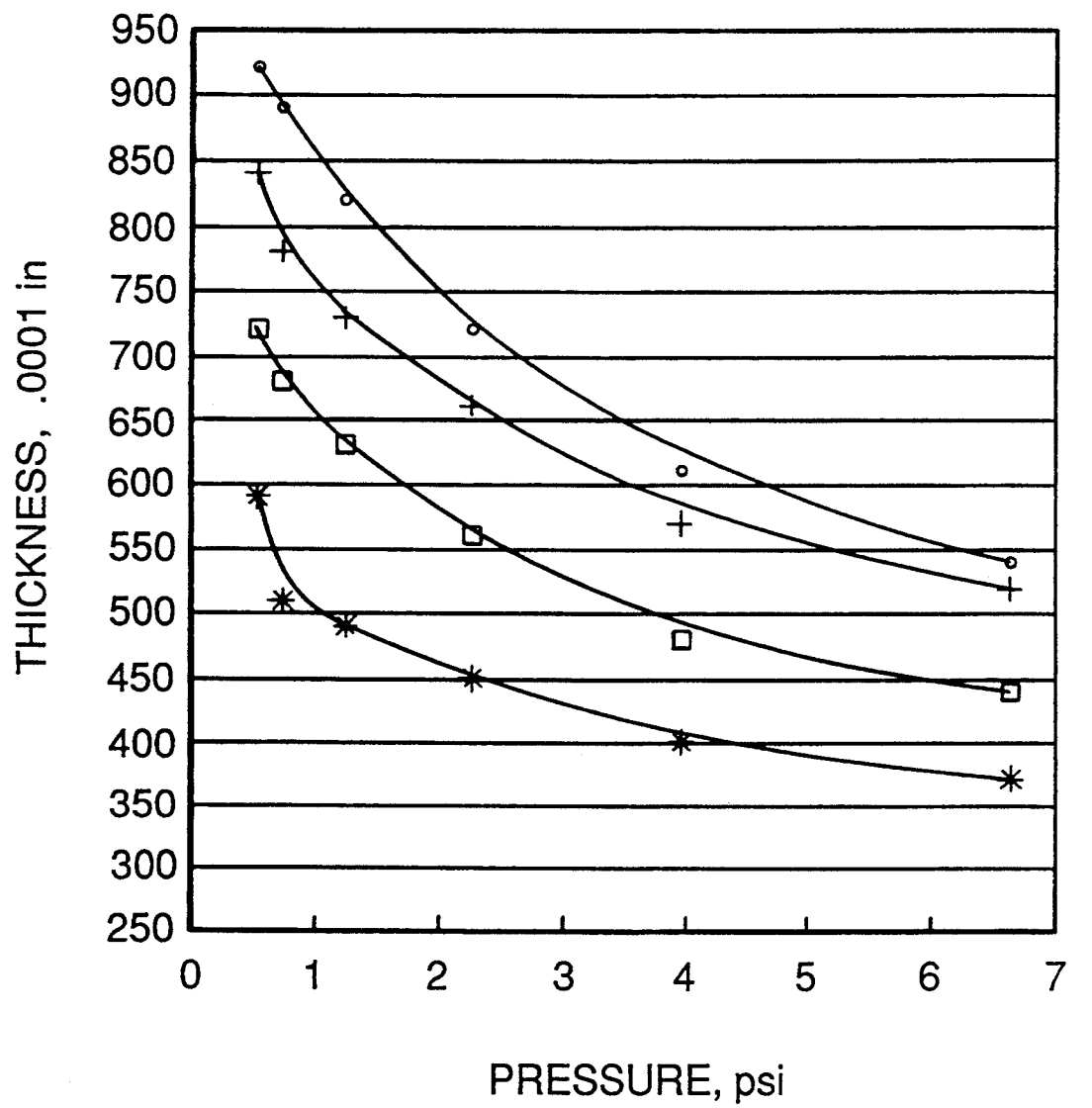
FIG. 5 is a compression curve and a rebound curve showing the compression characteristics, before and after electrolyte loading, of two glass fiber separator materials, one produced in accordance with the present invention, and one corresponding with prior art separator material.

Glass fiber separator was produced from a blend of glass fibers comprising 35 percent w/w Manville 206 glass fibers, average fiber diameter of 0.75$\mu$, and 65 percent w/w Manville 210X glass fibers, average fiber diameter of 3.0$\mu$. The separator had a grammage of 280 g/m$^2$. In accordance with the present invention, acidified water produced by adding $H_2SO_4$ to deionized water in an amount such that the acidified water had a pH between 2.5 and 2.7, was added to the separator in an amount such that the ratio of the combined weight of the dry separator and the weight of the acidified water to the weight of the dry separator was 2.7:1. The wetted separator, in accordance with the invention, was passed between compression rollers which were set so that, upon leaving the compression rollers, the wetted separator exhibited suppressed resiliency. A compression curve for this separator is presented in FIG. 5, designated Example 4-PC. In order to illustrate the degree of resiliency suppression exhibited by Example 4-PC, there is a compression curve, designated Control 4-Dry in FIG. 5, for a conventional, dry glass fiber separator corresponding in composition and grammage with the glass fiber separator of Example 4-PC. The Example 4-PC separator has a thickness which is between about 32% and 43% less, under various pressures, than the thickness of the Control 4-Dry separator at those pressures. Like the separators of Examples 1, 2 and 3, the Example 4-PC separator has suppressed resiliency by comparison with a dry but otherwise comparable separator and its resiliency can be restored in a controlled fashion.

After the testing described above, additional electrolyte, specifically, $H_2SO_4$ having a specific gravity of 1.286 g, was added to the Example 4-PC separator sample in an amount such that the ratio of the combined weights of the dry separator, acidified water and the electrolyte to the weight of the dry separator was 7:1. This ratio was selected to approximate the amount of the total electrolyte in a VRLA battery that would be carried in the glass fiber separator. Thereafter, the compression characteristics of the Example 4-PC separator loaded with electrolyte, were measured and the results are presented in FIG. 5 in a plot labeled Example 4-7X. To a large extent, the resiliency of the Example 4-PC separator was restored by the addition of electrolyte, as shown in the Example 4–7X plot. In fact, the resiliency of the Example 4–7X separator was substantially the same as the resiliency of the Control 4-Dry separator after it was loaded with electrolyte, specifically, $H_2SO_4$ having a specific gravity of 1.286 g, in an amount such that the ratio of the combined weight of the dry separator and the weight of the electrolyte to the weight of the dry separator was 7:1. The compression curve for this separator is designated Control 4–7X in FIG. 5.

EXAMPLE 5

Figure 6:
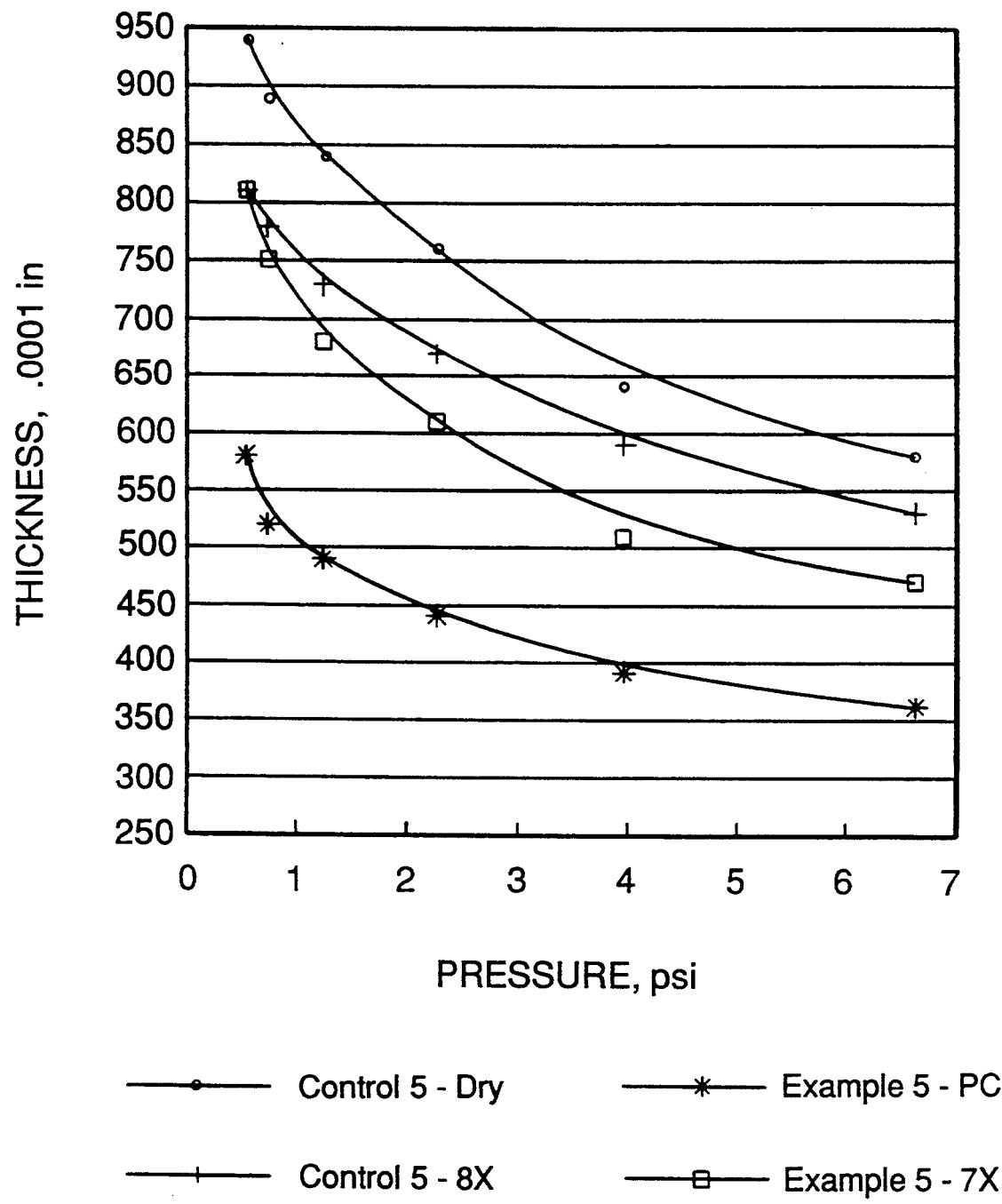
FIG. 6 is a compression curve and a rebound curve showing the compression characteristics, before and after electrolyte loading, of two glass fiber separator materials, one produced in accordance with the present invention, and one corresponding with prior art separator material.

Glass fiber separator was produced from a blend of glass fibers comprising 35 percent w/w Manville 206 glass fibers, average fiber diameter of 0.75$\mu$, and 65 percent w/w Manville 210X glass fibers, average fiber diameter of 3.0$\mu$. The separator had a grammage of 300 g/m$^2$. In accordance with the present invention, acidified water produced by adding $H_2SO_4$ to deionized water in an amount such that the acid had a pH between 2.5 and 2.7, was added to the separator in an amount such that the ratio of the combined weight of the dry separator and the weight of the acidified water to the weight of the dry separator was 2.7:1. The wetted separator, in accordance with the invention, was passed between compression rollers which were set so that, upon leaving the compression rollers, the wetted separator exhibited suppressed resiliency. A compression curve for this separator is presented in FIG. 6, designated Example 5-PC. In order to illustrate the degree of resiliency suppression exhibited by Example 5-PC, there is a compression curve, designated Control 5-Dry in FIG. 6, for a conventional, dry glass fiber separator corresponding in composition and grammage with the glass fiber separator of Example 5-PC. The Example 5-PC separator has a thickness which is between about 38% and 42% less, under various pressures, than the thickness of the Control 5-Dry separator at those pressures. Like the separators of Examples 1–4, the Example 5-PC separator has suppressed resiliency by comparison with a dry but otherwise comparable separator and its resiliency can be restored in a controlled fashion.

After the testing described above, additional electrolyte, specifically, $H_2SO_4$ having a specific gravity of 1.286 g, was added to the Example 5-PC separator sample in an amount such that the ratio of the combined weights of the dry separator, the acidified water and the electrolyte to the weight of the dry separator was 7:1. This ratio was selected to approximate the amount of the total electrolyte in a VRLA battery that would be carried in the glass fiber separator. Thereafter, the compression characteristics of the Example 5-PC separator loaded with electrolyte, were measured and the results are presented in FIG. 6 in a plot labeled Example 5–7X. To a large extent, the resiliency of the Example 5-PC separator was restored by the addition of electrolyte, as shown in the Example 5–7X plot. In fact, the resiliency of the Example 5–7X separator was substantially the same as the resiliency of the Control 5-Dry separator after it was loaded with electrolyte, specifically, $H_2SO_4$ having a specific gravity of 1.286 g, in an amount such that the ratio of the combined weight of the dry separator and the weight of the electrolyte to the weight of the dry separator was 7:1. The compression curve for this separator is designated Control 5–7X in FIG. 6.

EXAMPLE OF A METHOD FOR PRODUCING A VRLA BATTERY CELL

Figure 7:
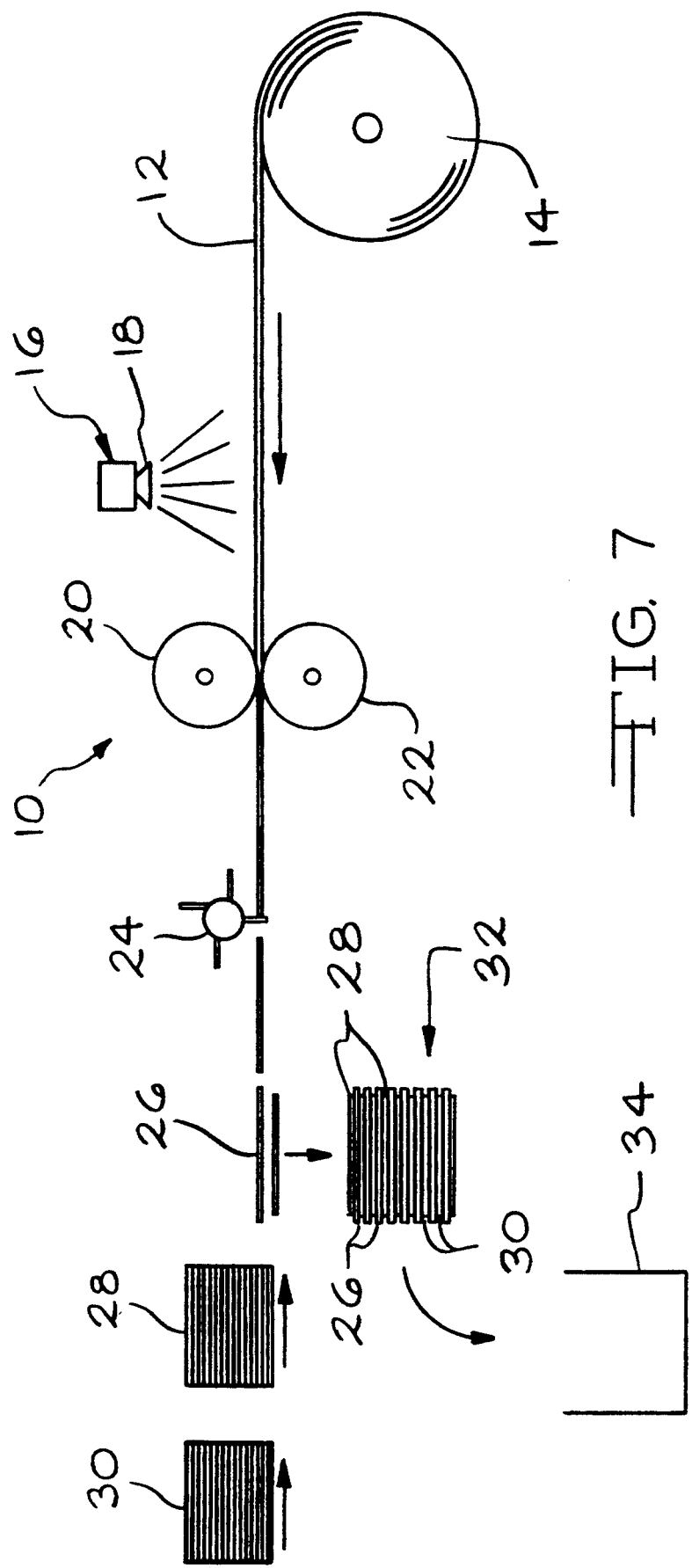
FIG. 7 is a schematic diagram of a station in a battery line where glass fiber separator material is wetted, compressed to a reduced thickness, cut to size, assembled in a cell stack which is then inserted, easily, into a battery case, according to the method of the present invention.

Referring now to FIG. 7, apparatus for producing a VRLA battery cell is indicated generally at 10 and comprises glass fiber separator 12 supplied from a roll 14, liquid spray means 16 including a nozzle 18, upper and lower compression rollers 20 and 22, and a cutter 24.

According to the method of the present invention, glass fiber separator 12 is unwound from the supply roll 14 and advances, right to left in FIG. 7, so that it passes under the spray nozzle 18 from which a controlled amount of resiliency suppressing liquid is sprayed or otherwise deposited on the glass fiber separator 12 as it passes below. According to the preferred embodiment of this method, the resiliency suppressing liquid is acidified water, specifically, deionized water to which sulfuric acid has been added to reach a pH of approximately 2.5 to 2.7. Other liquids known to be suitable for use in suppressing the resiliency of glass fiber separator include plain tap water, deionized water and sulfuric acid having a specific gravity of 1.286. It is contemplated that the liquid will serve well as a vehicle for introducing additives into a battery, such as sodium sulfate to control dendrite growth as well as other chemicals for the same or other purposes. The amount of liquid sprayed or deposited on the glass fiber separator is preferably such that the ratio of the combined weight of the dry separator and the weight of the resiliency suppressing liquid to the weight of the dry separator is between 2:1 and 4:1; more preferably between 2.5:1 and 3:1 and, most preferably, about 2.7:1.

The glass fiber separator 12 containing the resiliency suppressing liquid is advanced, right to left in FIG. 7, to pass between the compression rollers 20 and 22, which are set to compress the glass fiber separator to the extent that, upon leaving the compression rollers, the thickness of a separator according to the present invention, under a given nominal pressure, is reduced at least ten percent as compared with the thickness of dry glass fiber separator 12 under the same nominal pressure. Preferably, the thickness of a separator according to the present invention is reduced by at least twenty percent, and, most preferably, the thickness is reduced by at least thirty percent. It will be appreciated that, because of the resiliency of the glass fiber separator 12, in order to produce a separator with a thickness reduced by thirty percent, it will be necessary to set the compression rollers 20 and 22 so that, when the separator 12 is between them, its thickness is reduced by more than thirty percent and, upon leaving the compression roller, the thickness of the separator will increase, somewhat, from the thickness it had when it was exactly between the rollers 20 and 22. It may be desirable, in some cases, to use a second set of compression rollers (not shown) to sequentially reduce the thickness of the separator. The upper limit on thickness reduction is something which varies from separator to separator and is determined, in any case, by the degree of compression which can be sustained by a given glass fiber separator without glass fiber breakage to the extent that the separator loses its integrity.

After leaving the compression rollers 20 and 22, the reduced thickness separator is cut into separator sheets 26 having a length suitable for use in a given cell. The separator sheets are assembled with alternating positive electrodes 28 and negative electrodes 30 into a cell stack 32. The positive electrodes 28 and the negative electrodes 30 may either be tank formed, i.e., the paste material may be converted into active material outside the battery case or the electrodes may be formed in-situ after the cell stack is inserted into a battery case 34. In either case, the cell stack is assembled and inserted into the battery case 34. Because the separator sheets 26 have a reduced thickness, little or no compression need be applied to the cell stack in order to insert the cell stack within the case. In accordance with known practice, polymeric sheets (not shown) may be positioned on the outside of the cell stack to facilitate insertion of the cell stack into the battery case 34.

Owing to the reduced thickness of the separator sheets 26 in the cell stack 32, there is a very low degree of compression in the components of the cell stack. When electrolyte is loaded into the battery case, however, the resiliency of the individual separator sheets 26 is restored and substantial degree of compression of the cell stack components is achieved. When the cell stack 32 within the battery case 34 is loaded with electrolyte, the separator sheets 26 will try to expand but, because the battery case 34 constrains the cell stack components against expansion, compression is built up within the cell stack 32.

Figure 8:
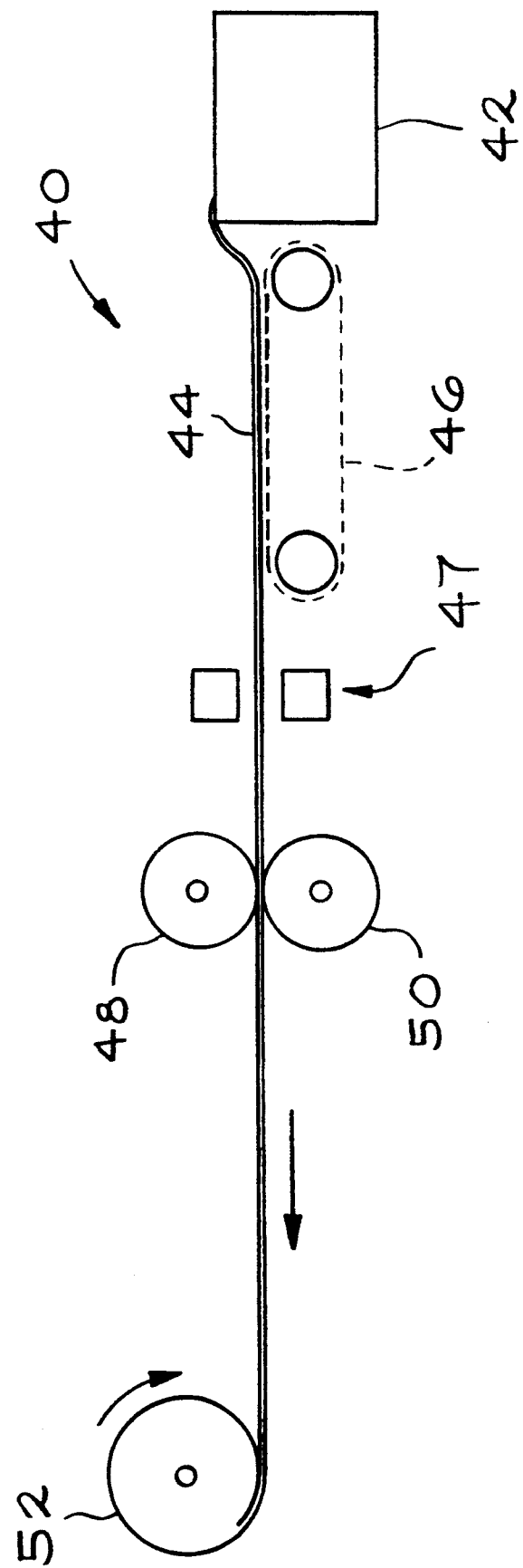
FIG. 8 is a schematic diagram of paper making equipment including apparatus for producing separator with inhibited resiliency in accordance with the method of the present invention.

Referring now to FIG. 8, apparatus for producing reduced thickness separator according to the present invention is indicated generally at 40. A head box 42 contains a glass fiber slurry which is deposited in a thin web 44 on a drainage screen 46. Drying devices 47 are provided in the apparatus and may comprises drying cans, heat lamps, drying ovens and other means for reducing the moisture content of the web 44. In conventional paper making, the moisture content of the web 44 would be preliminarily reduced on the drainage screen 46, and the moisture content of the web 44 would be further reduced, to virtually zero, by the drying devices 47. In contrast, and in accordance with the present invention, the glass fiber web is not dried completely; substantial moisture remains in the web 44 as it leaves the drying devices 47 and the moisture is present in a controlled amount. The amount of liquid which remains in the web is preferably such that, for a given piece of the web, the ratio of the combined weight of the web and the weight of the moisture to the weight the web would have if it was completely dried is between 2:1 and 4:1. More preferably, the ratio is between 2.5:1 and 3:1 and, most preferably, about 2.7:1.

Upon leaving the drainage screen 46, the web 44 is passed between upper and lower compression rollers 48 and 50, which are set to compress the web to the extent that, upon leaving the compression rollers 48 and 50, the thickness of the compressed web, under a given nominal pressure, is reduced at least ten percent as compared with the thickness that the web would have, under the same nominal pressure, if it was dried completely and had not been subjected to the action of the compression rollers 48 and 50. Preferably, the thickness of a separator according to the present invention is reduced by at least ten percent, and, most preferably, reduced by at least thirty percent. The upper limit on thickness reduction is something which varies from separator to separator and is determined, in any case, by the degree of compression which can be sustained by a given glass fiber separator without glass fiber breakage to the extent that the separator loses its integrity. Once the glass fiber web has been compressed, it can be wound up on a roll 52 for shipment to a battery manufacturing facility.

EXAMPLE 6

Figure 9:
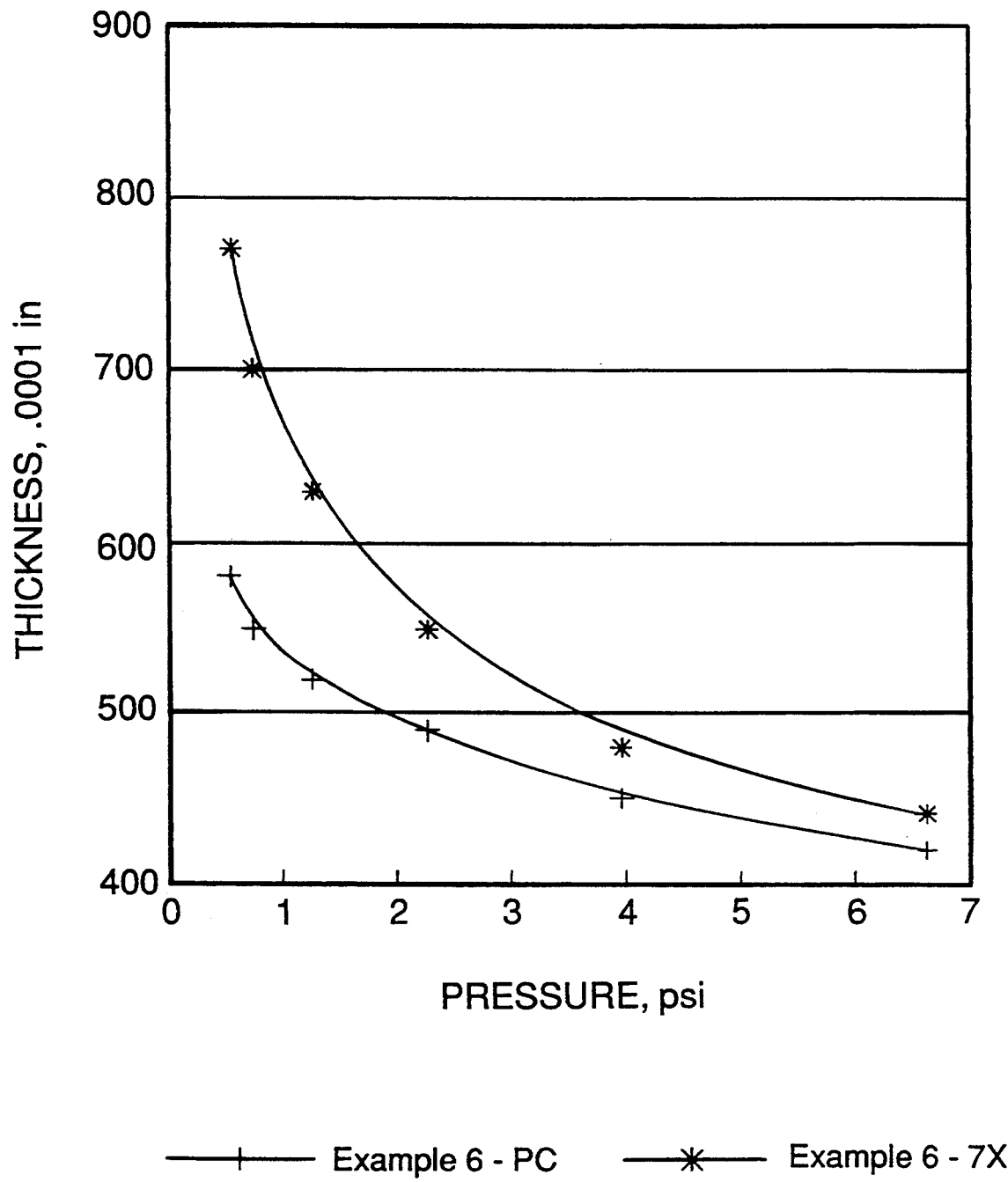
FIG. 9 is a compression curve and a rebound curve showing the compression characteristics, before and after electrolyte loading, of a glass fiber separator material produced in accordance with the present invention.
Figure 10:
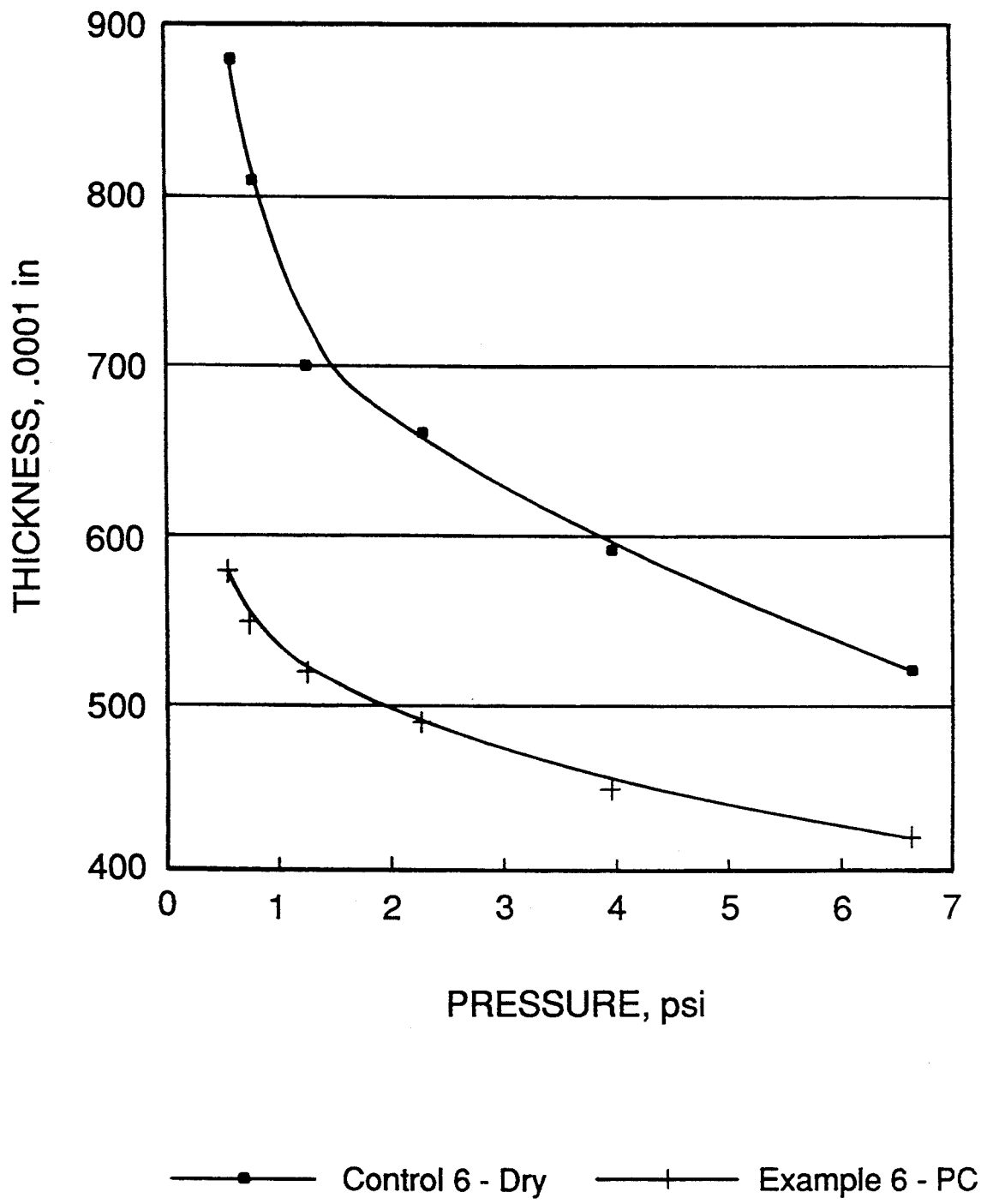
FIG. 10 is a compression curve showing the compression characteristics, before and after electrolyte loading, of a glass fiber separator material corresponding with prior art separator material.

Glass fiber separator was produced from a blend of glass fibers comprising 35 percent w/w Manville 206 glass fibers, average fiber diameter of $0.75\mu$, and 65 percent w/w Manville 210X glass fibers, average fiber diameter of $3.0\mu$. The separator had a grammage of 280 $g/m^2$ and a fiber surface area of 1.1 $m^2/g$. In accordance with the present invention, sulfuric acid having a specific gravity of 1.286 was added to the separator in an amount such that the ratio of the combined weight of the dry separator and the weight of the acid to the weight of the dry separator was 2.7:1. The wetted separator, in accordance with the invention, was passed between compression rollers which were set so that, upon leaving the compression rollers, the wetted separator exhibited suppressed resiliency. A compression curve for this separator is presented in FIG. 9, designated Example 6-PC. The degree of resiliency suppression exhibited by Example 6-PC is illustrated in FIG. 10 where the compression curve for Example 6-PC is plotted along with a compression curve, designated Control 6-Dry, for a conventional, dry glass fiber separator corresponding in composition and grammage with the glass fiber separator of Example 3-PC. The Example 6-PC separator has a thickness which is between about 20% and 34% less, under various pressures, than the thickness of the Control 7-Dry separator at those pressures. Under nominal pressures of 4 psi and less, the Example 6-PC glass fiber has a thickness which is between about 24% and 34% less than the thickness of the Control 7-Dry separator. The Example 6-PC separator has suppressed resiliency by comparison with a dry but otherwise comparable separator and its resiliency can be restored in a controlled fashion.

After the testing described above, electrolyte, specifically, $H_2SO_4$ having a specific gravity of 1.286 g, was added to the Example 6-PC separator sample in an amount such that the ratio of the combined weights of the dry separator and of the electrolyte to the weight of the dry separator was 7:1. This ratio was selected to approximate the amount of the total electrolyte in a VRLA battery that would be carried in the glass fiber separator. Thereafter, the compression characteristics of the Example 6-PC separator loaded with electrolyte, were measured and the results are presented in FIG. 9 in a plot labeled Example 6–7X. To a large extent, the resiliency of the Example 6-PC separator was restored by the addition of electrolyte, as shown in the Example 6–7X plot.

Figure 11:
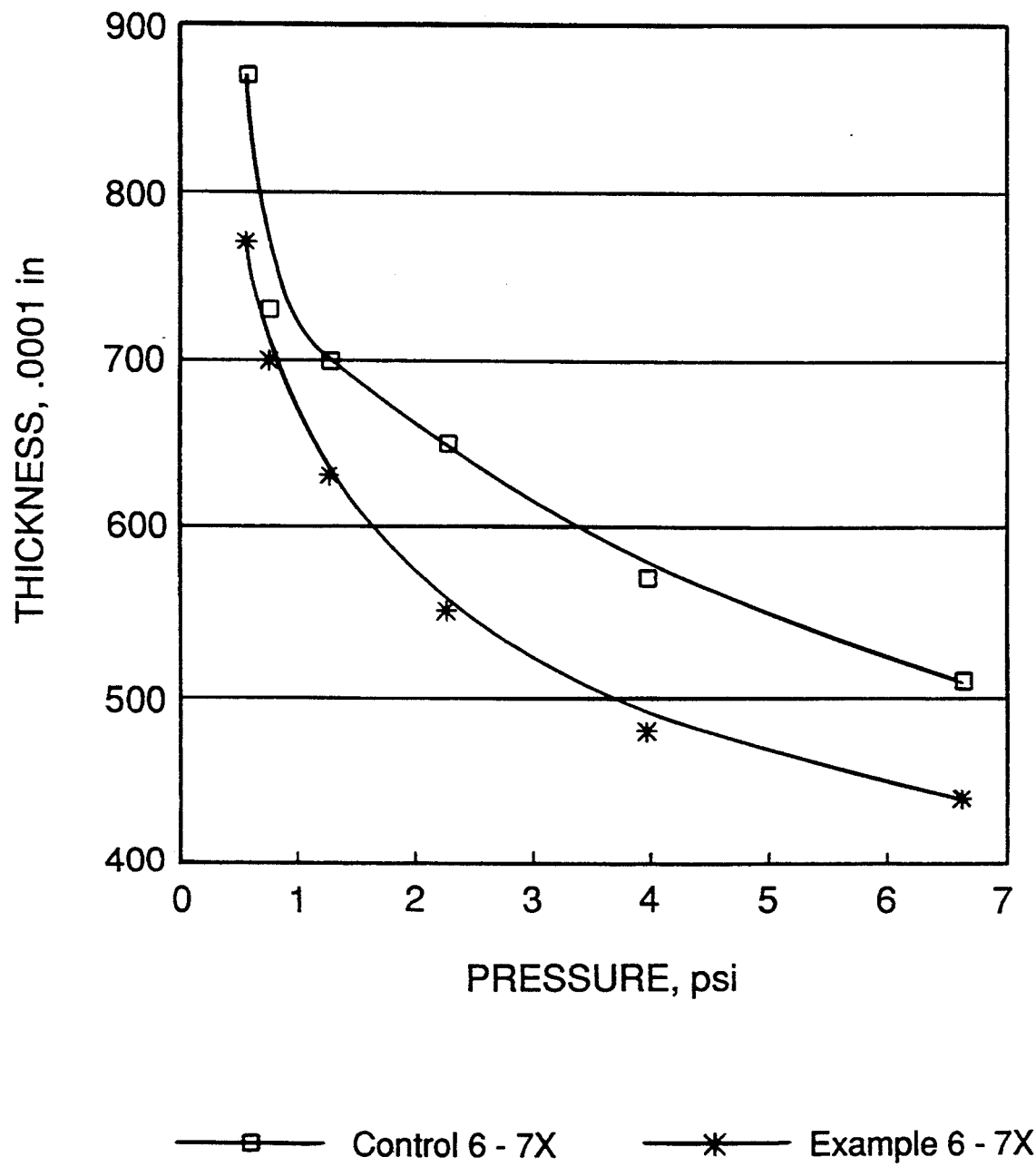
FIG. 11 is a compression curve showing the compression characteristics, after electrolyte loading, of two glass fiber separator materials, one produced in accordance with the present invention, and one corresponding with prior art separator material.

In FIG. 11, the resiliency of the Example 6–7X separator is compared to the resiliency Control 7-Dry separator after it was loaded with electrolyte, specifically, $H_2SO_4$ having a specific gravity of 1.286 g, in an amount such that the ratio of the combined weight of the dry separator and the weight of the electrolyte to the weight of the dry separator was 7:1. The compression curve for control separator loaded with electrolyte is designated Control 7-7X in FIG. 11.

Figure 12:
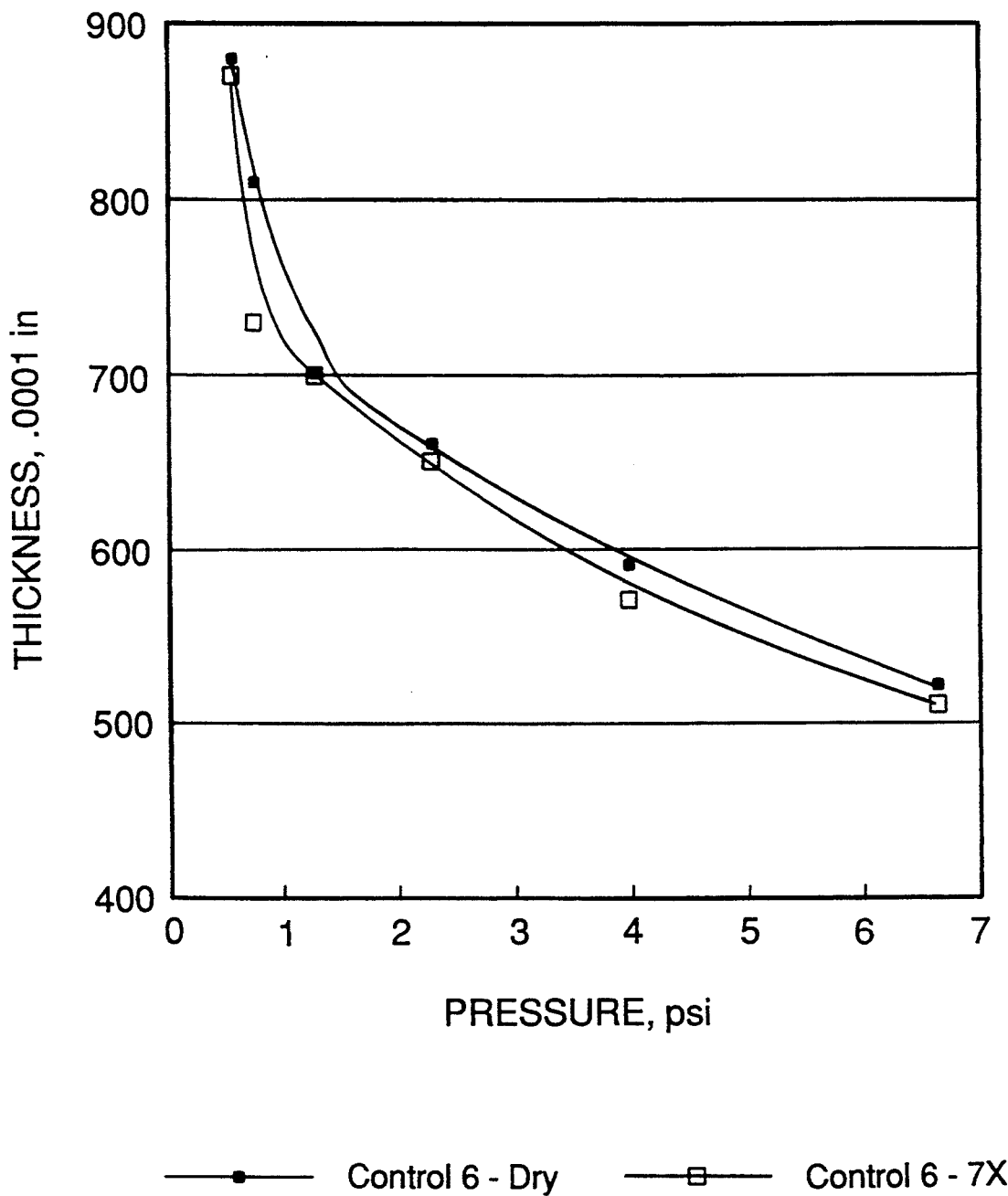
FIG. 12 is a compression curve showing the compression characteristics, before and after electrolyte loading, of a glass fiber separator material corresponding with prior art separator material.

In FIG. 12, the compression curve for the Control 7-Dry separator and the compression curve for the Control 7-7X separator are plotted together. The loading of the convention Control 7-Dry separator with electrolyte has virtually no effect on the compression characteristics of this material.

Although the present invention has been described in terms of specific embodiments, it is anticipated that alterations and modifications thereof will no doubt become apparent to those skilled in the art. It is intended that the appended claims be interpreted as covering all such alterations and modifications as fall within the true spirit and scope of the invention.

For example, although the invention has been described in the context of a glass fiber separator and a glass fiber web, it is specifically contemplated that fibers other than glass fibers may be incorporated into separators and separator webs according to the invention. Fibers other than glass that could be incorporated into separators according to the invention include synthetic polymeric fibers, such as polyethylene fibers disclosed as being suitable for incorporation in a separator according to the Badger U.S. Pat. No. 4,908,282. Further, it is to be understood that although the present invention has been described in terms of a single furnish having a specific proportion of fibers of a specific average diameter, the invention is in no way limited to such proportions or average fiber diameter. Indeed, a host of other furnishes including those presently known and those yet to be developed would be useful in practicing the present invention, so long as the furnish can be made into paper and the resulting paper has resiliency which can be suppressed by liquid combined with compression and restored by the addition of more liquid.

We claim:

1. A method for producing a valve regulated lead acid battery comprising a battery case and at least one cell made up of a separator comprising glass fibers, at least one positive plate, at least one negative plate and an amount of electrolyte contained in the plates and separator wherein a first portion of said amount of electrolyte is absorbed in and held by the separator, said method comprising the steps of:
    producing a substantially binder-free glass fiber separator having a first thickness when dry and containing an amount of liquid which is substantially less than the first portion of said amount of electrolyte and the liquid being substantially free of a binder for the glass fiber separator,
    compressing the separator to the extent that, when the compression is released, the separator has a second thickness which is substantially less than said first thickness,
    positioning the reduced thickness separator containing said amount of liquid between the positive and negative plates to produce a cell,
    easing the cell into the battery case wherein the cell components are under a degree of pressure, and
    adding electrolyte to the cell whereby the pressure between the components of the cell is increased by the restoration of the resiliency of the separator as electrolyte is absorbed in it.

2. The method claimed in claim 1 wherein the liquid is acidified water.

3. The method claimed in claim 1 wherein the liquid is sulfuric acid.

4. The method claimed in claim 1 wherein said second thickness is at least twenty percent less than said first thickness.

5. The method claimed in claim 4 wherein said second thickness is at least thirty percent less than said first thickness.

6. The method claimed in claim 1 wherein the ratio of the combined weight of said amount of liquid and the separator to the weight of the dry separator is between 2:1 and 4:1.

7. The method claimed in claim 6 wherein the ratio of the combined weight of said amount of liquid and the separator to the weight of the dry separator is between 2.5:1 and 3:1.

8. A method for producing a valve regulated lead acid battery comprising a battery case and at least one cell made up of a separator comprising glass fibers, at least one positive plate, at least one negative plate and an amount of electrolyte contained in the plates and separator wherein a first portion of said amount of electrolyte is absorbed in and held by the separator, said method comprising the steps of:
    producing a substantially binder-free glass fiber separator having a first thickness when dry and containing an amount of liquid wherein the ratio of the combined weight of said amount of liquid and the separator to the weight of the dry separator is between 2:1 and 4:1, and the liquid being substantially free of a binder for the glass fiber separator, compressing the separator to the extent that, when the compression is released, the separator has a second thickness which is at least twenty percent less than said first thickness,
    positioning the reduced thickness separator containing said amount of liquid between the positive and negative plates to produce a cell,
    easing the cell into the battery case wherein the cell components are under a degree of pressure, and
    adding electrolyte to the cell whereby the pressure between the components of the cell is increased by the restoration of the resiliency of the separator as electrolyte is absorbed in it.

9. A method for producing a valve regulated lead acid battery comprising a battery case and at least one cell made up of a separator comprising glass fibers, at least one positive plate, at least one negative plate and an amount of electrolyte contained in the plates and separator wherein a first portion of said amount of electrolyte is absorbed in and held by the separator, said method comprising the steps of:
    producing a glass fiber separator having a first thickness when dry and containing an amount of liquid which is substantially less than the first portion of said amount of electrolyte, compressing the separator to the extent that, when the compression is released, the separator containing the liquid has a second thickness which is substantially less than said first thickness,
    positioning the reduced thickness separator containing said amount of liquid between the positive and negative plates to produce a cell,
    easing the cell into the battery case wherein the cell components are under a degree of pressure, and
    adding electrolyte to the cell whereby the pressure between the components of the cell is increased by the restoration of the resiliency of the separator as electrolyte is absorbed in it.

10. The method claimed in claim 9 wherein the liquid is acidified water.

11. The method claimed in claim 9 wherein the liquid is sulfuric acid.

12. The method claimed in claim 9 wherein said second thickness is at least twenty percent less than said first thickness.

13. The method claimed in claim 12 wherein said second thickness is at least thirty percent less than said first thickness.

14. The method claimed in claim 9 wherein the ratio of the combined weight of said amount of liquid and the separator to the weight of the dry separator is between 2:1 and 4:1.

15. The method claimed in claim 14 wherein the ratio of the combined weight of said amount of liquid and the separator to the weight of the dry separator is between 2.5:1 and 3:1.

* * * * *